(12) United States Patent
Zheng et al.

(10) Patent No.: US 12,144,467 B2
(45) Date of Patent: Nov. 19, 2024

(54) INTELLIGENT CHOPPING BLOCK

(71) Applicant: SUNCHA TECHNOLOGY CO., LTD, Hangzhou (CN)

(72) Inventors: Chenglie Zheng, Hangzhou (CN); Ye Shen, Hangzhou (CN); Zhaokai Dong, Hangzhou (CN); Xi Chen, Hangzhou (CN); Maokui Ke, Hangzhou (CN); Yadan Tao, Hangzhou (CN); Hongchang Xu, Hangzhou (CN); Zhaocheng Zhou, Hangzhou (CN); Suxiang Lian, Hangzhou (CN)

(73) Assignee: SUNCHA TECHNOLOGY CO., LTD, Hangzhou (CN)

( * ) Notice: Subject to any disclaimer, the term of this patent is extended or adjusted under 35 U.S.C. 154(b) by 316 days.

(21) Appl. No.: 17/700,680

(22) Filed: Mar. 22, 2022

(65) Prior Publication Data

US 2023/0114928 A1 Apr. 13, 2023

(30) Foreign Application Priority Data

Oct. 8, 2021 (CN) .......................... 202122419919.2

(51) Int. Cl.
*A47J 47/00* (2006.01)
*G01G 19/52* (2006.01)
*G01G 23/37* (2006.01)

(52) U.S. Cl.
CPC ............ *A47J 47/005* (2013.01); *G01G 19/52* (2013.01); *G01G 23/37* (2013.01)

(58) Field of Classification Search
CPC .......................... A47J 47/005; H01L 21/6833
See application file for complete search history.

(56) References Cited

U.S. PATENT DOCUMENTS

| | | | | |
|---|---|---|---|---|
| 6,359,239 B1* | 3/2002 | Missler | .................. | G01G 21/22 708/133 |
| 6,371,470 B1* | 4/2002 | Ward | .................... | A47J 47/005 269/302.1 |
| 2004/0046301 A1* | 3/2004 | Thompson | ............ | A47J 47/005 269/289 R |
| 2005/0039607 A1* | 2/2005 | Comfield | .............. | A47J 47/005 99/324 |
| 2009/0072464 A1* | 3/2009 | Ishai | ........................ | B26D 7/20 83/13 |
| 2018/0110377 A1* | 4/2018 | Assassa | ................. | A47J 47/005 |
| 2020/0315404 A1* | 10/2020 | Altheimer | ............. | A47J 47/005 |
| 2023/0114928 A1* | 4/2023 | Zheng | .................... | G01G 19/52 269/100 |

\* cited by examiner

*Primary Examiner* — Lee D Wilson
(74) *Attorney, Agent, or Firm* — Perry + Currier

(57) ABSTRACT

An intelligent chopping block includes a base, a chopping block, an electronic scale, and a support hinge. The base comprises a first base and a second base, the first base has a first surface, and the first surface has a first area and a second area; the chopping block is disposed in the first area, and the chopping block comprises a whole bamboo chopping block and a food-separating chopping block, wherein the food-separating chopping block is used to separately process food according to different kinds. The electronic scale is disposed in the second area; and two ends of the support hinge are pivotally connected to the second base by a connecting shaft, and the support hinge is used to erect the intelligent chopping block when the intelligent chopping block is left unused.

9 Claims, 7 Drawing Sheets

INTELLIGENT CHOPPING BLOCK

CROSS-REFERENCE TO RELATED APPLICATIONS

The present disclosure claims priority to Chinese Patent Application No. 202122419919.2, entitled "Intelligent Chopping Block", filed with Chinese Patent Office on Oct. 8, 2021, the contents of which are incorporated herein by reference in entirety.

TECHNICAL FIELD

The present disclosure relates to the technical field of chopping blocks, in particular, to an intelligent chopping block.

BACKGROUND ART

In the prior art, the chopping blocks used by users generally have a single structure, and only include a processing area for cutting food materials, then when the users want to weigh or separately process the food materials, other tools usually need to be provided for assistance, such as an electronic scale or other chopping blocks. When the chopping block is not used, the chopping block has to rely on an object to be erected for space saving. To put the chopping block in this way, the chopping block is quite easy to slide off and is inconvenient for users to use. In addition, most chopping blocks currently on the market are used independently, but when first learning to cook dishes, the users can hardly control the amount and the proportion of the food materials.

SUMMARY

An objective of embodiments of the present disclosure lies in providing an intelligent chopping block, which can satisfy different demands of users when processing the food materials, for example, separately processing vegetables and fruits and raw meat, weighing the food materials, and holding or draining excess water produced when processing the food materials so that it will not contaminate other food materials. When the users do not use the chopping block, the users can stably erect the chopping block without sliding off, thereby effectively saving the space. The embodiments of the present disclosure increase the use functions of the chopping block, and improve the users' use experience.

Embodiments of the present disclosure are realized as follows.

In an embodiment, the present disclosure provides an intelligent chopping block, including a base, a chopping block, an electronic scale, and a support hinge. In the above, the base includes a first base and a second base; the first base has a first surface, and the first surface has a first area and a second area; the chopping block is disposed in the first area, and the chopping block includes a whole bamboo chopping block and a food-separating chopping block; the electronic scale is disposed in the second area; and two ends of the support hinge are pivotally connected to the second base by a connecting shaft.

In an embodiment, the first base further has a second surface, and the second surface is provided with a battery component accommodating groove.

In an embodiment, the second base further has a third surface, and the third surface is provided with a first limiting slot, a first limiting member, and a second limiting member for limiting degree of freedom of the connecting shaft.

In an embodiment, the second surface and the third surface are both provided with reinforcement ribs uniformly distributed.

In an embodiment, the intelligent chopping block further includes at least two silicone foot pads, and the silicone foot pads are provided on the support hinge and the second base.

In an embodiment, the whole bamboo chopping block includes a first bamboo chopping block and a second bamboo chopping block, wherein the first bamboo chopping block has a first upper surface and a first lower surface, the first upper surface is provided with a water collecting tank, a magnetic attraction indication area, and a first processing area; and the second bamboo chopping block has a second upper surface and a second lower surface, a side edge of the second bamboo chopping block is provided with a first clasp groove, and the second lower surface is provided with a first groove. The first lower surface is superposed with the second upper surface.

In an embodiment, the first bamboo chopping block further has the first lower surface, and the first lower surface is provided with at least one cutter-attracting magnet accommodating groove; and the whole bamboo chopping block further includes at least one cutter-attracting magnet, and the cutter-attracting magnet is provided in the cutter-attracting magnet accommodating groove, and the number of the cutter-attracting magnet is the same as the number of the cutter-attracting magnet accommodating groove.

In an embodiment, the first area of the first base is provided with a second groove, the food-separating chopping block is embedded in the first groove and the second groove, and the thickness of the food-separating chopping block is gradually decreased from a position close to the second area to a position away from the second area.

In an embodiment, the intelligent chopping block further includes at least one first positioning magnet, and the first positioning magnet is provided on the whole bamboo chopping block.

In an embodiment, the electronic scale includes a weighing component and a digital display component, the base is provided with a digital display component accommodating cavity, and the digital display component is provided in the digital display component accommodating cavity.

Compared with the prior art, the present disclosure has the following beneficial effects.

The present disclosure implements the multifunctional application of the intelligent chopping block by means of a plurality of configurations, such as the food-separating chopping block, the support hinge, the electronic scale, and the first positioning magnet, so that the user implements multiple operations, such as weighing, APP interconnection, and separate processing of food materials, when using the intelligent chopping block, the convenience when the user uses the chopping block is increased, and the separate processing of the food materials can also avoid contaminant caused by processing the food materials on the same processing surface. When the user does not use the intelligent chopping block, the support hinge of the intelligent chopping block can be turned over, so that the intelligent chopping block can be erected on a plane without relying on other objects, thereby saving the space and facilitating the use of the user.

BRIEF DESCRIPTION OF DRAWINGS

In order to more clearly illustrate technical solutions of embodiments of the present disclosure, accompanying drawings which need to be used in the embodiments of the present disclosure will be introduced briefly below, and it should be understood that the accompanying drawings below merely show some embodiments of the present disclosure, therefore, they should not be considered as limitation on the scope, and those ordinarily skilled in the art still could obtain other relevant accompanying drawings according to these accompanying drawings, without using any creative efforts.

Figure 1:
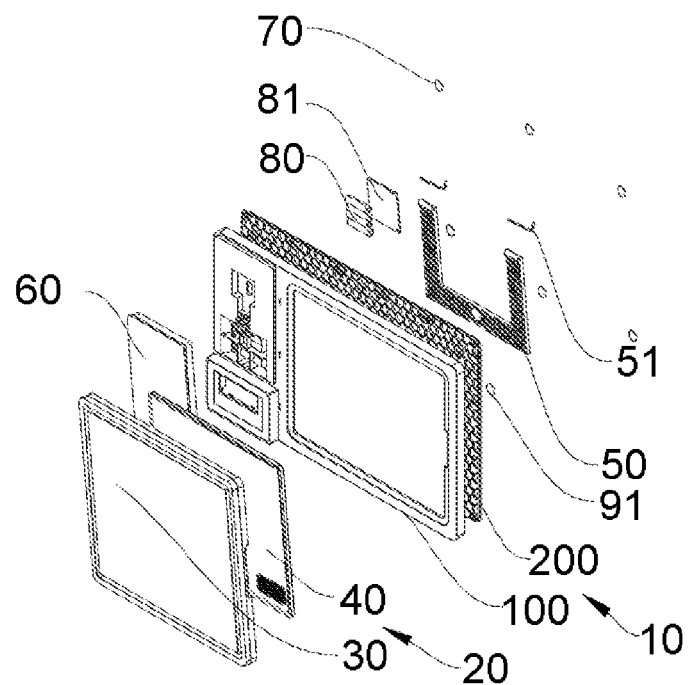
FIG. 1 is an exploded view of components of an intelligent chopping block shown in an embodiment of the present disclosure.

Reference signs: 1—intelligent chopping block; 10—base; 100—first base; 101—first area; 102—second area; 103—partition block; 110—first surface; 111—first groove; 112—first clasp groove; 113—digital display component housing; 114—first boss; 115—weighing component groove; 120—second surface; 121—reinforcement rib; 122—battery component accommodating groove; 123—first snap groove; 124—digital display component accommodating cavity; 125—base snap groove; 126—second positioning magnet groove; 20—chopping block; 200—second base; 201—first connecting shaft hole; 202—first limiting slot; 203—first limiting member; 204—second limiting member; 210—third surface; 211—base snap piece; 212—battery cover plate hole; 213—first snap piece; 214—threaded through hole; 220—fourth surface; 221—silicone foot pad accommodating groove; 222—support hinge accommodating groove; 223—first accommodating groove; 30—whole bamboo chopping block; 31—first bamboo chopping block; 33—second bamboo chopping block; 310—first upper surface; 311—water collecting tank; 312—first processing area; 313—magnetic attraction indication area; 320—first lower surface; 321—cutter-attracting magnet groove; 330—second upper surface; 331—first positioning magnet groove; 340—second lower surface; 341—second clasp groove; 342—second groove; 35—cutter-attracting magnet; 40—food-separating chopping block; 400—food-separating chopping block surface; 401—third groove; 411—rigid bump; 410—grinding area; 420—second processing area; 50—support hinge; 500—sixth surface; 51—connecting shaft; 510—seventh surface; 511—third clasp groove; 512—second connecting shaft hole; 513—square groove; 60—electronic scale; 61—weighing component; 610—weighing panel; 611—weighing component fixing plate; 612—weight sensor; 62—digital display component; 620—digital display panel; 621—digital display electronic component; 70—silicone foot pad; 80—battery; 81—battery cover plate; 90—first positioning magnet; 91—second positioning magnet.

DETAILED DESCRIPTION OF EMBODIMENTS

Terms such as "first", "second", and "third" are merely for distinguishing the description, but do not indicate arrangement sequence numbers, nor can they be construed as indicating or implying importance in the relativity.

Moreover, the terms "horizontal", "vertical", "overhanging", and the like do not mean that the parts are required to be absolutely horizontal or overhanging, but may be slightly inclined. For example, "horizontal" merely means that a structure is more horizontal in comparison with "vertical", rather than being completely horizontal, while the structure can be slightly inclined.

In the description of the present disclosure, it should be indicated that orientation or positional relationships indicated by terms such as "inner", "outer", "left", "right", "upper", and "lower" are based on orientation or positional relationships as shown in the drawings, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limiting the present disclosure.

In the description of the present disclosure, it also should be indicated that unless otherwise specified and defined explicitly, terms "provide", "mount", "join", and "connect" should be construed in a broad sense, for example, it may be a fixed connection, a detachable connection, or an integral connection; it may be a mechanical connection, or also may be an electrical connection; it may be a direct connection, an indirect connection through an intermediary medium, or inner communication between two elements.

Technical solutions of the present disclosure will be described below clearly and completely in combination with accompanying drawings.

Referring to FIG. 1, FIG. 1 is an exploded view of components of an intelligent chopping block 1 shown in an embodiment of the present disclosure. In an embodiment, the present disclosure provides an intelligent chopping block 1, including a base 10, a chopping block 20, a support hinge 50, a connecting shaft 51, and an electronic scale 60.

In the above, the base 10 includes a first base 100 and a second base 200; the chopping block 20 includes a whole bamboo chopping block 30 and a food-separating chopping block 40; and two ends of the support hinge 50 are pivotally connected to the second base 200 by the connecting shaft 51.

In an operating process, when using the intelligent chopping block 1, the user can fold the support hinge 50, and when the intelligent chopping block 1 is left unused, the user can unfold the support hinge 50, to form triangular support together with the base 10, and erect the intelligent chopping block 1 to save the space.

In an embodiment, the intelligent chopping block 1 further includes 6 silicone foot pads 70, wherein 5 silicone foot pads 70 are provided on the second base 200, and 1 silicone foot pad 70 is provided on the support hinge 50. The silicone foot pads 70 are used for antiskid and shock absorption when processing the food materials.

In other embodiments of the present disclosure, the number and positions of silicone foot pads 70 may be arranged otherwise according to specific situations.

In an embodiment, the intelligent chopping block 1 further includes a battery 80 and a battery cover plate 81, wherein the battery 80 is configured to supply power to support the user to weigh the food materials or carry out other operations such as timing and APP interconnection when processing the food materials, and the battery cover plate 81 is configured to seal the battery 80.

In an embodiment, the intelligent chopping block 1 further includes at least one second positioning magnet 91, and the second positioning magnet 91 is provided on the first base 100 for attracting the whole bamboo chopping block 30.

Figure 2:
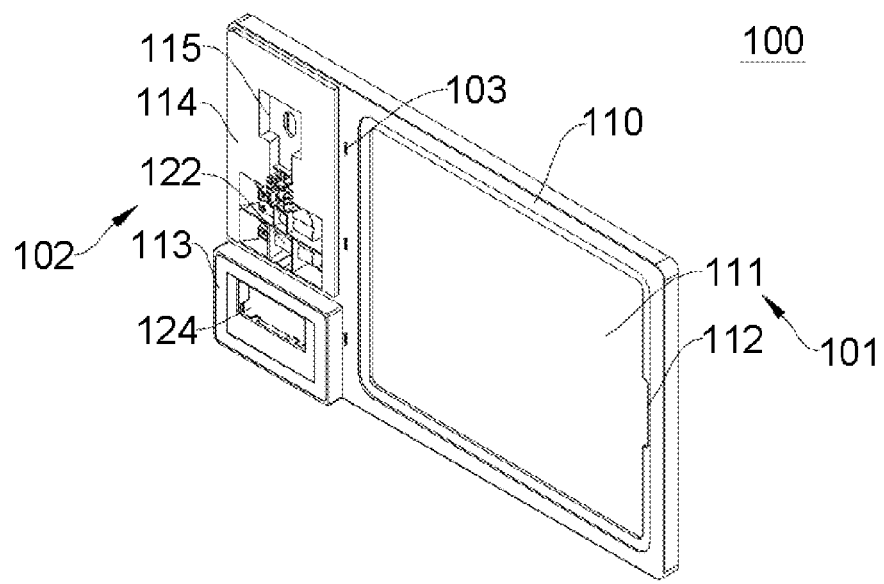
FIG. 2 is a structural schematic view of a first base shown in an embodiment of the present disclosure.

Referring to FIG. 2, FIG. 2 is a structural schematic view of the first base 100 shown in an embodiment of the present disclosure. As shown in FIG. 2, the first base 100 has a first surface 110, and the first surface 110 has a first area 101 and a second area 102; the chopping block 20 is disposed in the first area 101, and the electronic scale 60 is disposed in the second area 102. 3 partition blocks 103 are disposed at the junction of the first area 101 and the second area 102, so as to guide the user to place the whole bamboo chopping block 30 in the first area 101 when returning the whole bamboo chopping block 30 after using the whole bamboo chopping block 30.

In an embodiment of the present disclosure, the first area 101 is further provided with a first groove 111 and a first clasp groove 112, an edge of the first groove 111 is in step-shaped transition to the first surface 110, for receiving the food-separating chopping block 40 shown in FIG. 1; and the first clasp groove 112 is provided at an edge of a bottom surface of the first groove 111, so as to facilitate taking and placing the food-separating chopping block 40 shown in FIG. 1.

In an embodiment of the present disclosure, the second area 102 is provided with a digital display component housing 113, and when the first base 100 and the second base 200 are stacked, a digital display component accommodating cavity 124 is formed; the second area 102 is further provided with a first boss 114, the first boss 114 is provided with a weighing component groove 115, and the weighing component groove 115 and the digital display component accommodating cavity 124 are configured to accommodate components required by the electronic scale 60, so as to facilitate connection and power supplying of the components required by the electronic scale 60.

In an embodiment of the present disclosure, corners of the first base 100, the second base 200, and the first groove 111 adopt a chamfered transition design to improve the safety of use.

Figure 3:
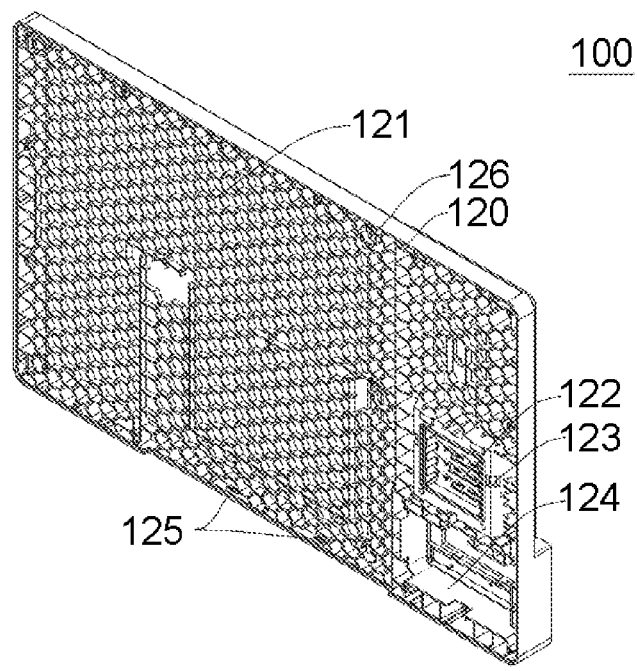
FIG. 3 is a structural schematic view of the first base shown in an embodiment of the present disclosure from another viewing angle.

Referring to FIG. 3, FIG. 3 is a structural schematic view of the first base 100 shown in an embodiment of the present disclosure from another viewing angle. As shown in FIG. 3, the first base 100 further has a second surface 120, and the second surface 120 is provided with a battery component accommodating groove 122, a second positioning magnet groove 126, a base snap groove 125, and reinforcement ribs 121.

In the above, three first snap grooves 123 are provided on edges of the battery component accommodating groove 122; and the reinforcement ribs 121 are distributed on the second surface 120 densely in a hexagonal honeycomb shape; two base snap grooves 125 are provided on a side edge of the first base 100; four second positioning magnet grooves 126 are provided, and located at four corners of the second area 102 for placing the whole bamboo chopping block 30, for accommodating the second positioning magnet 91 shown in FIG. 1. Correspondingly, there are also four second positioning magnets 91.

In other embodiments of the present disclosure, at least one first snap groove 123 and at least one base snap groove 125 are provided, and the specific number and set position thereof are determined according to specific requirements of installation and use.

Figure 4:
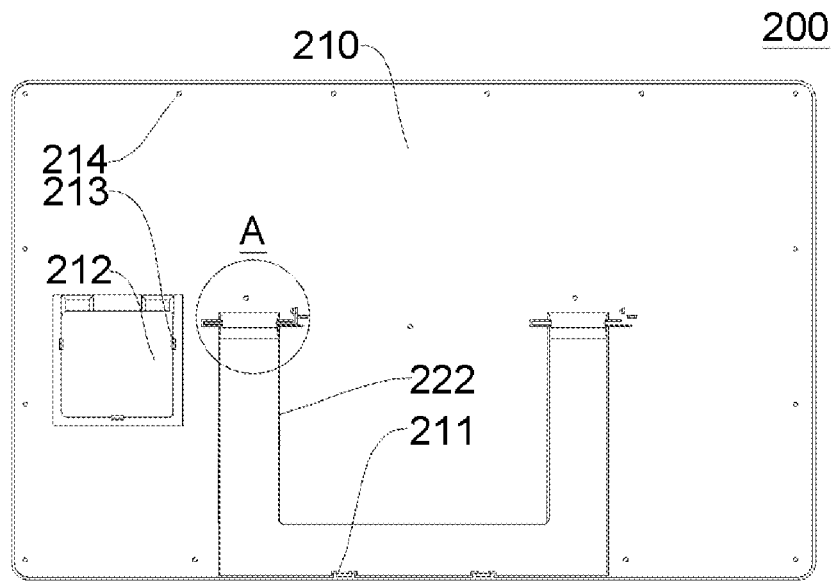
FIG. 4 is a structural schematic view of a second base shown in an embodiment of the present disclosure.

Referring to FIG. 4, FIG. 4 is a structural schematic view of the second base 200 shown in an embodiment of the present disclosure. As shown in FIG. 4, the second base 200 has a third surface 210, the third surface 210 is provided with a battery cover plate hole 212, and three first snap pieces 213 are provided on edges of the battery cover plate hole 212. When the first base 100 and the second base 200 are snapped into one piece, the first snap piece 213 and the first snap groove 123 are also snapped together.

In an embodiment, the second base 200 is further provided with a threaded through hole 214 and two base snap pieces 211, wherein the base snap pieces 211 may cooperate with the base snap grooves 125 shown in FIG. 3, and the threaded through hole 214 and the base snap piece 211 are configured to connect the first base 100 and the second base 200.

In an embodiment, the second surface 120 and the third surface 210, stacked to form the base 10, are both provided with uniformly distributed reinforcement ribs 121 and are similar in structure, and the reinforcement ribs 121 can increase the contact area between the second surface 120 and the third surface 210, thereby ensuring that when the intelligent chopping block 1 is in use, there will be no serious dull thud due to knocking. In addition, as the areas of the first base 100 and the second base 200 are large, the reinforcement ribs 121 can ensure the strength and stability of the base 10 to prevent deformation. In order to make the reference signs clear and accurate in the drawings, the reinforcement ribs 121 are not shown in FIG. 4 and FIG. 5, and reference is made to FIG. 1 and FIG. 3 for details.

In an embodiment, a support hinge accommodating groove 222 is presented as a protrusion on the third surface 210, and corresponding design is made at two ends of the support hinge accommodating groove 222, so that the connecting shaft 51 is fixed in position when connecting the support hinge 50 and the second base 200, preventing the connecting shaft 51 from falling off during the folding process of the support hinge 50. For details, reference is made to the partial enlarged schematic view of FIG. 5 below.

Figure 5:
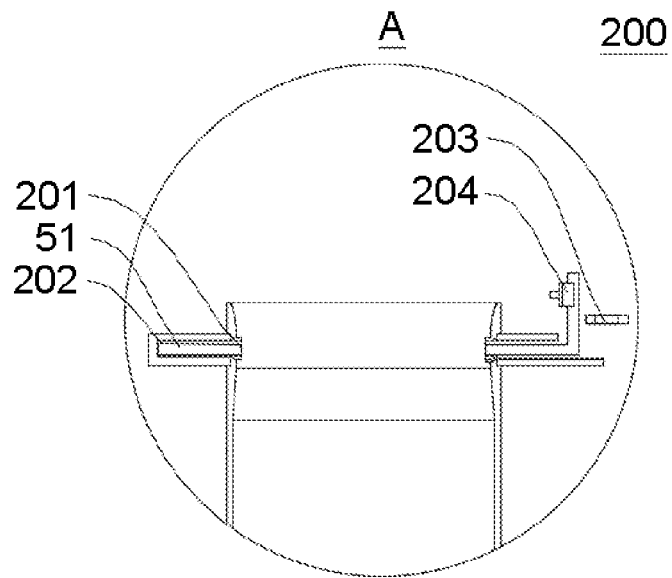
FIG. 5 is a partial enlarged schematic view of part A in FIG. 4 shown in an embodiment of the present disclosure.

Referring to FIG. 5, FIG. 5 is a partial enlarged schematic view of the second base 200 shown in an embodiment of the present disclosure. As shown in FIG. 5, the third surface 210 further includes a first limiting slot 202, a first limiting member 203, and a second limiting member 204; in combination with what is shown in FIG. 1 and FIG. 5, the connecting shaft 51 is L-shaped, and one end of the connecting shaft 51 protrudes from a first connecting shaft hole 201 and is accommodated in the first limiting slot 202; the other end is disposed between the first limiting member 203, the second limiting member 204, and the third surface 210, and the first limiting slot 202, the first limiting member 203, and the second limiting member 204 limit the movement of the connecting shaft 51, so as to prevent the connecting shaft 51 from falling off when the user folds the support hinge 50 during the use of the intelligent chopping block 1.

Figure 6:
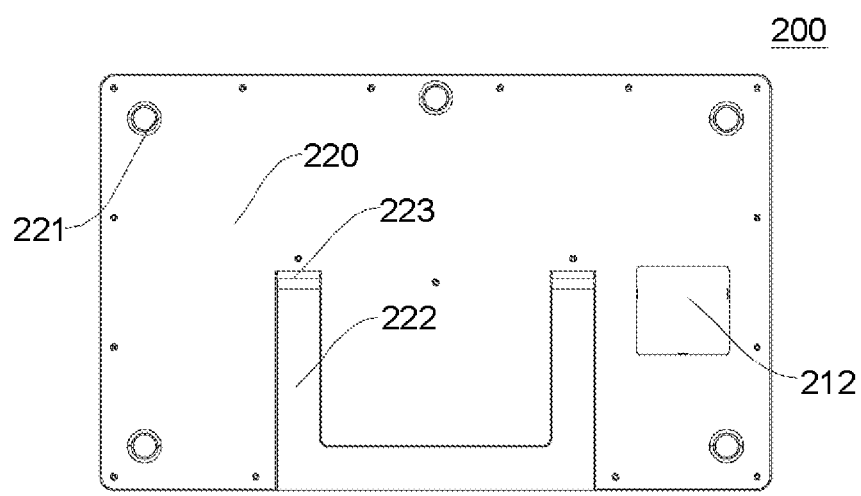
FIG. 6 is a structural schematic view of the second base shown in an embodiment of the present disclosure from another viewing angle.

Referring to FIG. 6, FIG. 6 is a structural schematic view of the second base 200 shown in an embodiment of the present disclosure from another viewing angle. As shown in FIG. 6, the second base 200 further has a fourth surface 220, and the fourth surface 220 is provided with 5 silicone foot pad accommodating grooves 221, the support hinge accommodating groove 222, and a first accommodating groove 223. The support hinge accommodating groove 222 is connected to the first accommodating groove 223. As the two ends of the support hinge 50 are provided with holes for accommodating the connecting shaft 51, in order to accommodate the two ends of the support hinge 50, the position of the first accommodating groove 223 is deeper relative to the support hinge accommodating groove 222. The battery cover plate hole 212 is provided between the support hinge accommodating groove 222 and an edge of the second base 200; and the silicone foot pad accommodating grooves 221 are provided at edges of the fourth surface 220.

In an embodiment of the present disclosure, the first base 100 and the second base 200 not only can be connected by way of a clamping groove and screw fastening, but also can be connected by way of ultrasonic hot melt adhesive, etc., so that the second surface 120 of the first base 100 and the third surface 210 of the second base 200 are attached together. The connection manner may be one of the above methods, or may be more of the methods.

Figure 7:
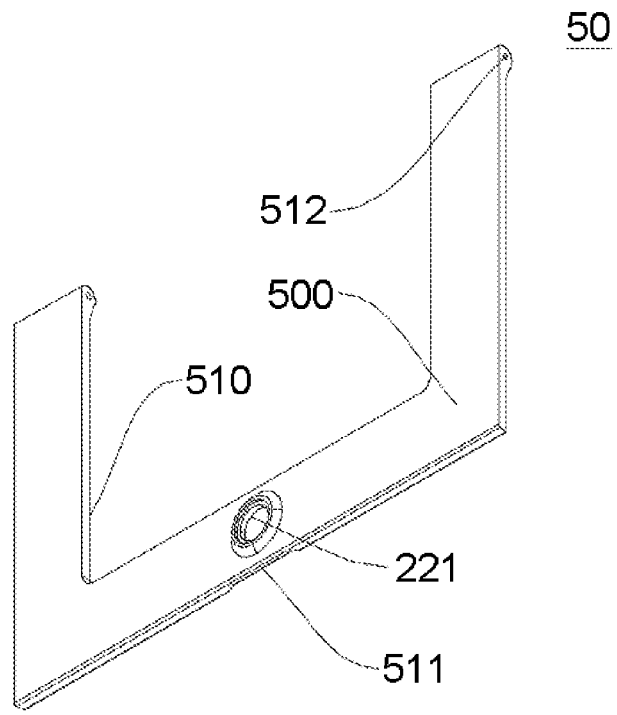
FIG. 7 is a structural schematic view of a support hinge shown in an embodiment of the present disclosure.

Referring to FIG. 7, FIG. 7 is a structural schematic view of the support hinge 50 shown in an embodiment of the present disclosure. As shown in FIG. 7, the support hinge 50 has a sixth surface 500 and a seventh surface 510, wherein the sixth surface 500 is provided with a silicone foot pad accommodating groove 221 for accommodating the silicone foot pad 70, and when the support hinge 50 is not used, the seventh surface 510 is attached to the second base 200, and the support hinge 50 is accommodated in the support hinge accommodating groove 222 and the first accommodating groove 223.

In an embodiment, two ends of the support hinge 50 are each provided with a second connecting shaft hole 512 for accommodating the connecting shaft 51.

Referring to FIG. 5, FIG. 6, and FIG. 7, in an operating process, after the support hinge 50 is placed in the support hinge accommodating groove 222, one end of the connecting shaft 51 passes through the second connecting shaft hole 512 and is accommodated in the first limiting slot 202, and the other end of the connecting shaft 51 is placed between the first limiting member 203, the second limiting member 204, and the third surface 210, so that the connecting shaft 51 can be rotated in the first connecting shaft hole 201 and the second connecting shaft hole 512, to drive the support hinge 50 to be turned over without falling off.

Figure 8:
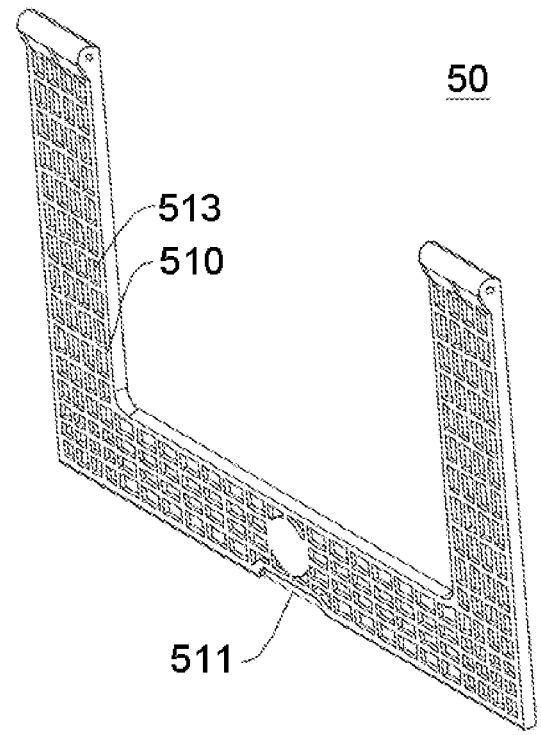
FIG. 8 is a structural schematic view of the support hinge shown in an embodiment of the present disclosure from another viewing angle.

Referring to FIG. 8, FIG. 8 is a structural schematic view of the support hinge 50 shown in an embodiment of the present disclosure from another viewing angle. As shown in FIG. 8, a seventh surface 510 of the support hinge 50 is further provided with square grooves 513 uniformly distributed densely and a third clasp groove 511. The square grooves 513 can save the material of the support hinge 50 and ensure the strength of the support hinge 50, so that the intelligent chopping block 1 is lighter and more stable in use.

The third clasp groove 511 is configured to facilitate unfolding the support hinge 50 when the support hinge 50 needs to be turned over.

Figure 9:
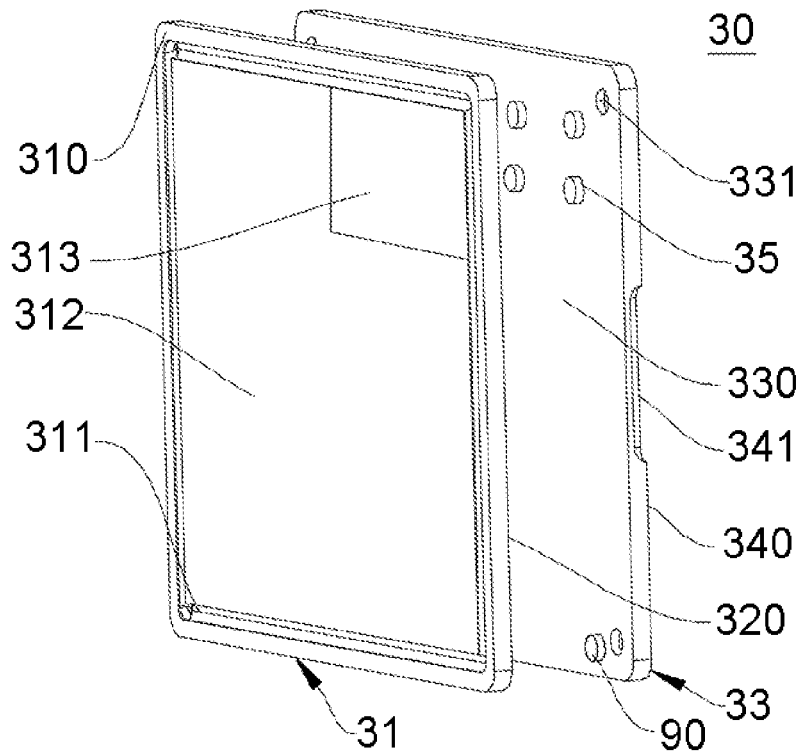
FIG. 9 is an exploded view of components of a whole bamboo chopping block shown in an embodiment of the present disclosure.

Referring to FIG. 9, FIG. 9 is an exploded view of components of the whole bamboo chopping block 30 shown in an embodiment of the present disclosure. As shown in FIG. 9, in an embodiment, the whole bamboo chopping block 30 includes a first bamboo chopping block 31 and a second bamboo chopping block 33. In the above, the first bamboo chopping block 31 has a first upper surface 310, and the first upper surface 310 is provided with a water collecting tank 311, a magnetic attraction indication area 313, and a first processing area 312; the second bamboo chopping block 33 has a second upper surface 330 and a second lower surface 340, a side edge of the second bamboo chopping block 33 is provided with a first clasp groove 112, and the first lower surface 320 is superposed with the second upper surface 330.

The magnetic attraction indication area 313 is configured to attract a cutter when the user temporarily puts aside the cutter, so as to avoid the cutter from falling off to hurt people when the user accidentally hits the cutter, thereby improving the use safety of the intelligent chopping block 1. In an embodiment of the present disclosure, the magnetic attraction indication area 313 is provided at a corner of the first upper surface 310.

In other embodiments of the present disclosure, the magnetic attraction indication area 313 may also be provided in other areas of the first upper surface 310.

In another embodiment of the present disclosure, the whole bamboo chopping block 30 is in a two-layer composite structure.

In other embodiments of the present disclosure, the whole bamboo chopping block 30 may include at least one bamboo chopping block 20, and the specific structure and feature may be arranged otherwise with reference to the above design in the embodiments of the present disclosure.

In an embodiment, the intelligent chopping block 1 further includes 4 first positioning magnets 90, and the first positioning magnets 90 are provided in the first positioning magnet grooves 331 of the second upper surface 330.

In an embodiment of the present disclosure, there are four first positioning magnet grooves 331, respectively at four corners of the second upper surface 330.

In other embodiments of the present disclosure, the first positioning magnet groove 331 may be provided at other positions, and the number and positions of first positioning magnet grooves 331 may be arranged otherwise according to specific requirements. Correspondingly, the number and positions of first positioning magnets 90 and second positioning magnets 91 are arranged according to the number and positions of first positioning magnet grooves 331.

Figure 10:
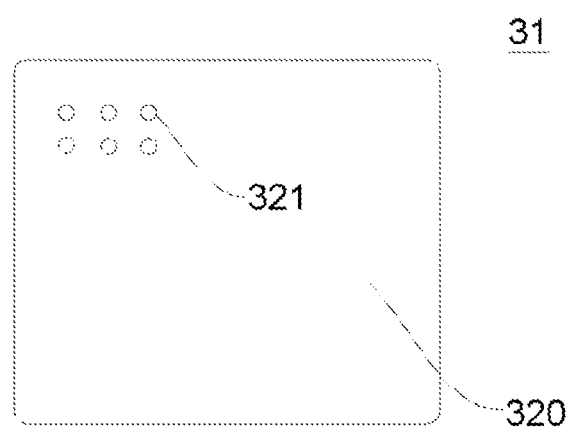
FIG. 10 is a structural schematic view of a first bamboo chopping block shown in an embodiment of the present disclosure.

FIG. 10 is a structural schematic view of the first bamboo chopping block 31 shown in an embodiment of the present disclosure; in an embodiment, the first bamboo chopping block 31 further has a first lower surface 320, and the first lower surface 320 is provided with 6 cutter-attracting magnet grooves 321 located at a corner of the first lower surface 320.

Cutter-attracting magnets 35 are provided in the cutter-attracting magnet grooves 321, and the number of cutter-attracting magnets is the same as the number of cutter-attracting magnet grooves 321, and an attraction range of the cutter-attracting magnets 35 corresponds to the position of the magnetic attraction indication area 313.

In an embodiment of the present disclosure, the cutter-attracting magnet grooves 321 and the cutter-attracting magnets 35 may be arranged on other surfaces or other positions, and the number and positions of the cutter-attracting magnet grooves 321 and cutter-attracting magnets 35 may be arranged otherwise according to the actual structure design of the bamboo chopping block 30.

Figure 11:
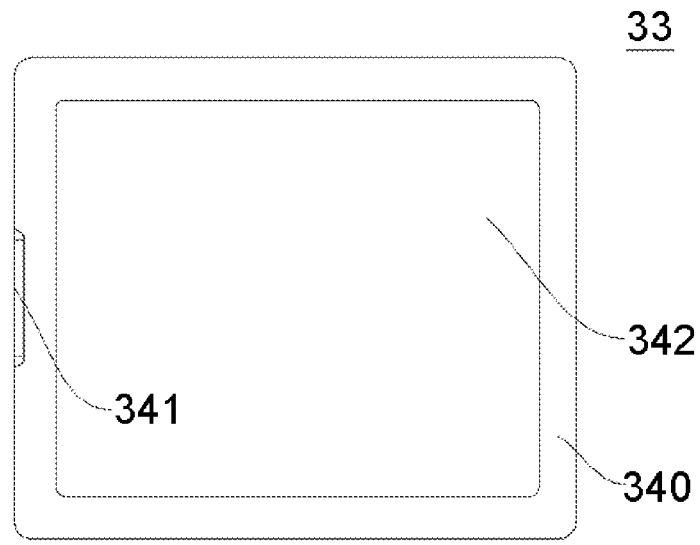
FIG. 11 is a structural schematic view of a second bamboo chopping block shown in an embodiment of the present disclosure.

FIG. 11 is a structural schematic view of the second bamboo chopping block 33 shown in an embodiment of the present disclosure. As shown in FIG. 11, a second groove 342 and a second clasp groove 341 are provided on the second lower surface 340, the second groove 342 is configured to accommodate the food-separating chopping block 40, and the second clasp groove 341 is provided on a side edge of the second lower surface 340.

Figure 12:
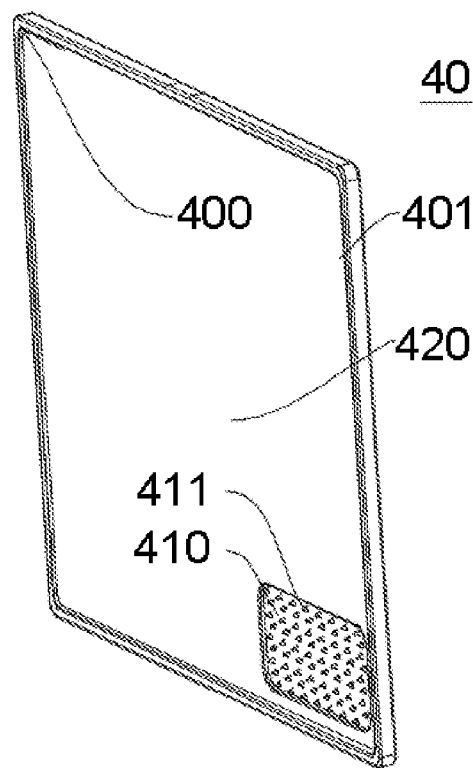
FIG. 12 is a structural schematic view of a food-separating chopping block shown in an embodiment of the present disclosure.

Referring to FIG. 12, FIG. 12 is a structural schematic view of the food-separating chopping block 40 shown in an embodiment of the present disclosure. With reference to FIG. 3 and FIG. 11, the food-separating chopping block 40 is embedded in the first groove 111 and the second groove 342, and a third groove 401 is provided on a food-separating chopping block surface 400; a second processing area 420 and a grinding area 410 are provided in the third groove 401, the grinding area 410 is provided at a corner of the third groove 401, and the grinding area 410 is provided with densely and uniformly distributed rigid bumps 411; and the second processing area 420 is provided in the third groove 401 in an area other than the grinding area 410.

In an embodiment of the present disclosure, the rigid bumps 411 have a shape of triangular pyramid; and in other embodiments of the present disclosure, the rigid bumps also may be provided in other shapes according to requirements of the grinding area 410.

In an embodiment of the present disclosure, the thickness of the food-separating chopping block 40 is gradually decreased from a position close to the electronic scale 60 to a position away from the electronic scale 60, for preventing the water generated when processing the food materials from flowing to the electronic scale 60 to cause damage or contamination.

In other embodiments of the present disclosure, specific positions and structures of second processing area 420 and grinding area 410 may be arranged otherwise according to use requirements.

In an operating process of the present disclosure, the user can process food such as meat on the first processing area 312 of the whole bamboo chopping block 30; when the food materials are different, considering from a health perspective, the intelligent chopping block 1 is further provided with the food-separating chopping block 40, and the food-separating chopping block 40 is provided with the second processing area 420, which can be used for separately processing different food materials, and when the user needs to grind food materials or flavorings, the food-separating chopping block 40 is further provided with the grinding area 410, and grinding can be carried out by the rigid bumps 411 of the grinding area 410.

Figure 13:
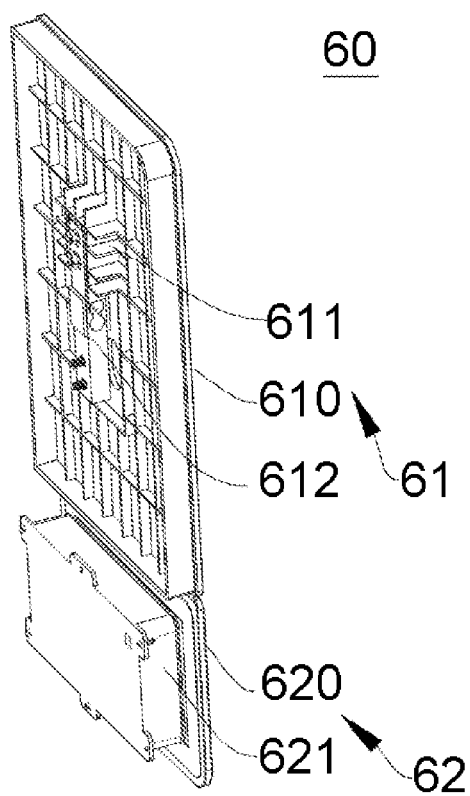
FIG. 13 is a structural schematic view of an electronic scale shown in an embodiment of the present disclosure.

As shown in FIG. 13, FIG. 13 is a structural schematic view of the electronic scale 60 shown in an embodiment of the present disclosure. Referring to FIG. 1, FIG. 2, and FIG. 13, in an embodiment, the electronic scale 60 includes a weighing component 61 and a digital display component 62.

In an embodiment of the present disclosure, the second area 102 is further provided with a first boss 114, the first boss 114 is provided with a weighing component groove 115, the weighing component 61 includes a weighing panel 610, a weight sensor 612, and a weighing component fixing plate 611, the weight sensor 612 and the weighing component fixing plate 611 are accommodated in the weighing component groove 115, and the weighing panel 610 is provided on the first boss 114.

In an embodiment of the present disclosure, the second area 102 is provided with a digital display component housing 113, and when the first base 100 and the second base 200 are stacked, a digital display component accommodating cavity 124 is formed, the digital display component 62 includes a digital display electronic component 621, and the digital display electronic component 621 is provided in the digital display component accommodating cavity 124. The digital display component 62 further includes a digital display panel 620, and the digital display panel 620 covers the digital display component housing 113.

The present disclosure implements the multifunctional application of the intelligent chopping block 1 by means of a plurality of configurations, such as the food-separating chopping block 40, the support hinge 50, the electronic scale 60, and the first positioning magnet 90, so that the user implements multiple operations, such as weighing, APP interconnection, and separate processing of food materials, when using the intelligent chopping block 1, the convenience when the user uses the chopping block 20 is increased, and the separate processing of the food materials can also avoid contamination caused by processing the food materials on the same processing surface. When the user does not use the intelligent chopping block 1, the support hinge 50 of the intelligent chopping block 1 can be turned over, so that the intelligent chopping block 1 can be erected on a plane without relying on other objects, thereby saving the space and facilitating the use of the user.

It should be indicated that the features in the embodiments of the present disclosure may be combined with each other if there is no conflict.

The above-mentioned are merely for preferred embodiments of the present disclosure and not used to limit the present disclosure. For one skilled in the art, various modifications and changes may be made to the present disclosure. Any modifications, equivalent substitutions, improvements and so on, made within the spirit and principle of the present disclosure, should be covered within the scope of protection of the present disclosure.

What is claimed is:

1. An intelligent chopping block, comprising:
a base, comprising a first base and a second base, wherein the first base has a first surface, and the first surface has a first area and a second area;
a chopping block, wherein the chopping block is disposed in the first area, and the chopping block comprises a whole bamboo chopping block and a food-separating chopping block;
an electronic scale, disposed in the second area; and
a support hinge, wherein each end of the support hinge is pivotally connected to the second base by a connecting shaft;
wherein the whole bamboo chopping block comprises:
a first bamboo chopping block, having a first upper surface and a first lower surface, wherein the first upper surface is provided with a water collecting tank, a magnetic attraction indication area, and a first processing area; and
a second bamboo chopping block, having a second upper surface and a second lower surface, wherein a side edge of the second bamboo chopping block is provided with a first clasp groove, and the second lower surface is provided with a second groove, wherein the first lower surface and the second upper surface are superposed with each other to form the whole bamboo chopping block.

2. The intelligent chopping block according to claim 1, wherein the first base further has a second surface, and the second surface is provided with a battery component accommodating groove.

3. The intelligent chopping block according to claim 2, wherein the second base further has a third surface, and the third surface is provided with a first limiting slot, a first limiting member, and a second limiting member which are configured for limiting movement of the connecting shaft.

4. The intelligent chopping block according to claim 3, wherein the first base further has a second surface, and the second surface and the third surface are both provided with reinforcement ribs uniformly distributed.

5. The intelligent chopping block according to claim 1, wherein the intelligent chopping block further comprises at least two silicone foot pads, and the silicone foot pads are provided on the support hinge and the second base.

6. The intelligent chopping block according to claim 1, wherein the first bamboo chopping block further has the first lower surface, and the first lower surface is provided with at least one cutter-attracting magnet groove; and the whole bamboo chopping block further comprises at least one cutter-attracting magnet, the at least one cutter-attracting magnet is provided in the at least one cutter-attracting magnet groove, and number of the at least one cutter-attracting magnet is the same as number of the at least one cutter-attracting magnet groove.

7. The intelligent chopping block according to claim 1, wherein the first area is provided with a first groove, the food-separating chopping block is embedded in the first groove and the second groove, and a thickness of the food-separating chopping block is gradually decreased from a position close to the second area to a position away from the second area.

8. The intelligent chopping block according to claim 1, wherein the intelligent chopping block further comprises at least one first positioning magnet, and the first positioning magnet is provided on the whole bamboo chopping block.

9. The intelligent chopping block according to claim 1, wherein the electronic scale comprises a weighing component and a digital display component, the base is provided with a digital display component accommodating cavity, and the digital display component is provided in the digital display component accommodating cavity.

* * * * *